Aug. 4, 1964  K. H. PATTERSON  3,143,709
BROAD BAND FREQUENCY MULTIPLIER AND MIXER
Filed Sept. 19, 1962  7 Sheets-Sheet 1

FIG. 1

INVENTOR.
KENNETH H. PATTERSON
BY
S. J. Rotondi, A. J. Dupont & M. W. Bachrach

FIG. 2

INVENTOR.
KENNETH H. PATTERSON

Aug. 4, 1964   K. H. PATTERSON   3,143,709
BROAD BAND FREQUENCY MULTIPLIER AND MIXER
Filed Sept. 19, 1962   7 Sheets-Sheet 6

TRIPLER INPUT

TRIPLER OUTPUT

TRIPLER OUTPUT, SQUARED

TRIPLER OUTPUT, SQUARED AND DIFFERENTIATED

DOUBLER OUTPUT

DOUBLER OUTPUT, SQUARED

*INVENTOR.*
KENNETH H. PATTERSON
BY
*S.J. Rotondi, A.J. Dupont + M.W. Bachrach*

FIG. 8

INVENTOR.
KENNETH H. PATTERSON

United States Patent Office 3,143,709
Patented Aug. 4, 1964

3,143,709
BROAD BAND FREQUENCY MULTIPLIER AND MIXER
Kenneth H. Patterson, Aberdeen, Md., assignor to the United States of America as represented by the Secretary of the Army
Filed Sept. 19, 1962, Ser. No. 224,876
20 Claims. (Cl. 328—133)
(Granted under Title 35, U.S. Code (1952), sec. 266)

The invention described herein may be manufactured and used by or for the Government for governmental purposes without the payment of any royalties thereon.

This invention relates generally to broad band frequency multiplier and mixer circuits and particularly to a circuit for measuring dispersive Doppler.

Ionospheric properties can be measured and determined by evaluation of any changes occuring to the frequencies of radio waves passing through the ionosphere. If a radio wave is transmitted through a vacuum, the only frequency change occurring thereto would be caused by the Doppler effect. When a radio wave is transmitted through the ionosphere, however, its velocity of propagation is altered slightly from that occurring in a vacuum because of the variable properties and conditions which are present in the atmosphere along the path of the wave. If these small differential frequencies, referred to as dispersive Doppler, can be measured, then it is possible under certain assumptions to compute the total electron content between a signal source and the receiver and to study other pertinent characteristics of the ionosphere. The Doppler effect or frequency shift is that change in frequency arising from a relative motion between the signal source and the receiver, whereas, dispersive Doppler is that additional change resulting due to the presence of the ionosphere.

These properties of the ionosphere have heretofore been measured by instrumental sounding rockets, however, the short time and the relatively small number of flights of such vehicles give little information about seasonal diurnal, and temporal variations. In addition, the heretofore practiced techniques of measuring ionospheric properties have been inadequate in many respects. For example, prior instrumentalities have not been practical for use in the field, have restricted band width operation, and produced outputs which were not satisfactory for data reproduction and reduction purposes. Furthermore, the accuracy of prior systems and techniques is questionable, especially when only one signal constitutes the input and extraneous factors including noise are not eliminated or reduced in the circuitry. Consequently, additional or supplementary information is necessary for establishing a more accurate concept of the electrical conditions prevailing at high altitudes.

The best approach for solving the above mentioned problems has been the harmonically related two-frequency dispersive Doppler technique. Such a technique has been used for other experiments on numerous occasions in the past and involves the transmission of two harmonically related signals from the same source and having frequencies which differ by a predetermined multiple. The Doppler frequency shift of one of the signals is multiplied and mixed with the Doppler frequency shift of the other signal to obtain a measure of the dispersive Doppler. The principal problem with this technique has been in the multiplication operation required for the lower of the two signals, since the frequencies thereof are widely variable and of the order of more than one full octave of variation.

It is, therefore, an object of this invention to provide a circuit which will measure dispersive Doppler.

It is another object of this invention to provide a circuit for the measurement of dispersive Doppler which will have a sinusoidal output.

Another object of the present invention is to provide a frequency multiplier and mixer in which the multiplication factor may be any product composed of twos and threes.

Yet another object of the instant invention is to provide a frequency multiplier and mixer in which the band width exceeds one octave.

These and other objects of the present invention will be more fully realized and understood from the following detailed description when taken in conjunction with the accompanying drawings in which.

Like numerals throughout the various views and figures of the drawings designate like components.

For purposes of the particular exemplification drawn and described herein, it will be assumed that a satellite radiating a number of CW carriers will constitute the signal source. Two signals having frequencies of 54 and 324 megacycles respectively have been chosen for the particular exemplification because of the phase coherence and frequency separation thereof. As previously explained, therefore, if the space surrounding the earth and also encompassing the satellite orbit were a perfect vacuum, the Doppler frequency shift superimposed on these two carriers, arising from the motion of the satellite, would bear an exact six-to-one ratio. However, because of the presence of the ionosphere, the Doppler frequency shift at 324 megacycles is not precisely equal to six times the Doppler shift at 54 megacycles. If the Doppler frequency shift at 324 megacycles is allowed to mix with six times the Doppler frequency shift at 54 megacycles the small differential frequency, referred to as dispersive Doppler, will result.

In order to receive the Doppler signals from a satellite, it is necessary to use extremely sensitive receiving systems. Such systems must be provided with exceptionally narrow pass-bands for the radiowave signals as, for example, of the order of 10 cycles per second as obtainable from phase-locked tracking filters. Technical problems dictate that these filters must operate in the audio frequency range with an upper limit slightly higher than 20 kilocycles. In practice, the incoming carriers are heterodyned down to a suitable audio frequency and then applied to the tracking filters. Each filter provides an output which is phase locked to the input. As a result, the filtered audio-frequency output responds to any change in frequency (or phase) which may occur in the original radio-frequency carrier.

In making dispersive Doppler measurements the local oscillator injections for each receiving channel must be derived from a common source. Any drift in phase or in frequency is then cancelled in the final phase comparison. Since a six-to-one ratio exists between the two carrier frequencies mentioned above, the local oscillator injection frequencies and the heterodyne audio-frequencies must also bear ths same six-to-one relationship.

Because of the ready availability and because of the excellent past performances provided by the phase-locked tracking filters, it is desirable, for dispersive Doppler measurements, to use one of these filters in each of the two receiving channels. The total Doppler change, from one pass of a satellite, is about 2 kc. on the 54-mc. carrier and about 12 kc. at 324 mc. Thus, to accommodate the same type of tracking filter in each channel, the frequencies of the local oscillator injections should be set to provide an average output frequency, from the receiver, of approximately 2500 c.p.s. in the channel originating at 54 mc. The other channel, originating at 324 mc., will then provide an average output frequency of about 15 kc. This means that in a tracking operation, the Doppler effect will cause the output of one tracking filter to vary from near 3500 c.p.s. to about 1500 c.p.s. while the other changes from approximately 21 kc. to about 9 kc. The end result is that the tracking filters provide the necessary sensitivity, but their operation is such that the original RF carrier frequencies must be converted to audio-frequencies. The amount of the Doppler effect, however, is not changed in either channel. Consequently, the two audio frequencies vary by amounts which exceed one full octave. To obtain dispersive Doppler, the principal problem, after filtering, is to multiply the lower of these two widely variable frequency outputs by six. The result can then be mixed with the higher frequency output to provide the desired differential or dispersive Doppler data.

It may occur to one that a more straight forward technique would be to multiply the lower frequency while it is in the intermediate stages of the receiver. Under these circumstances conventional frequency multipliers would be entirely satisfactory. Both filters would then track at essentially the same frequency and the entire operation would be less complex. Unfortunately, such a simplified method produces a deleterious effect upon the signal to noise ratio. This is a result of the fact that practical frequency multipliers are necessarily non-linear in operation. The output of such non-linear elements contains cross modulation noise products which are not present at the input. The energy concentration, on a power basis, of these newly-created noise components is proportional to the pre-multiplier passband. It is also proportional to the multiplication factor. The most serious difficulty arises from the fact that a portion of this extraneous noise power must fall in that part of the passband which is centered about the carrier frequency. This is true even though this extraneous noise is entirely generated, in the non-linear multiplier, by the action of noise components located throughout the entire pre-multiplier passband. Consequently, any subsequent bandwidth reduction cannot possibly remove these new multiplier-generated noise components which fall within the remaining passband. However, in the technique to be described here, this noise compounding is avoided, thus producing a definitely superior signal-to-noise ratio.

Figure 1:
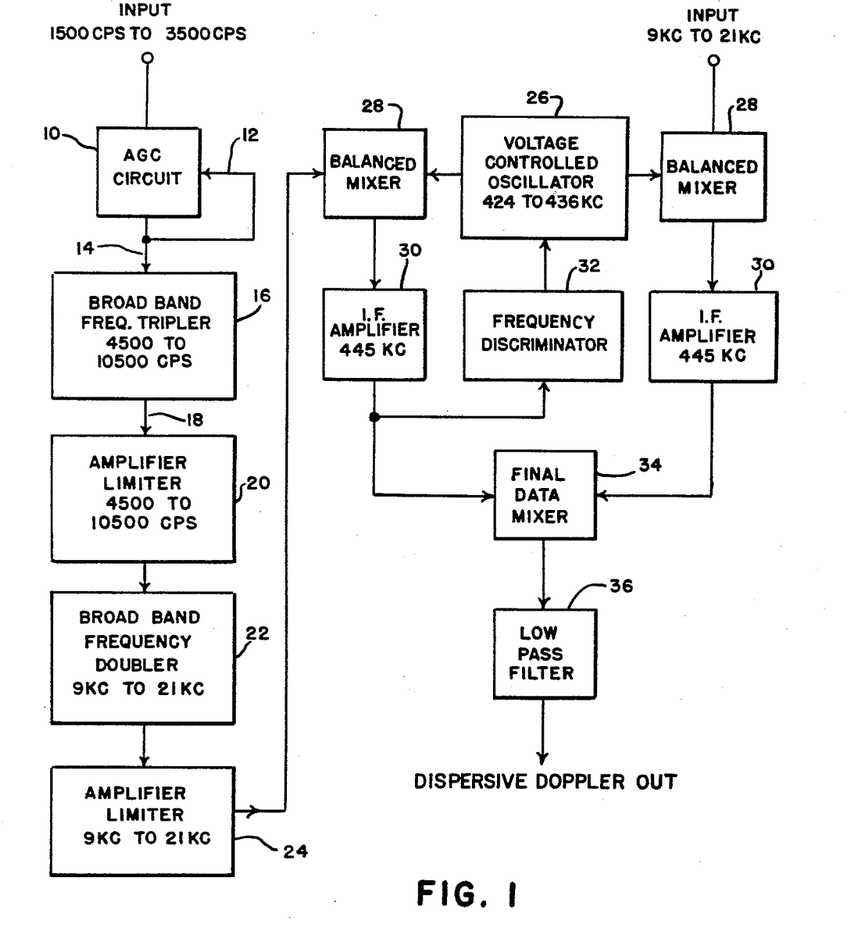
FIG. 1 is a schematic block diagram of the invention.

In reference to FIGURE 1, there is shown a block diagram of the novel frequency multiplier and mixer circuit for measuring dispersive Doppler. The particular exemplification shown therein accomplishes a frequency multiplication by a factor of six. It is to be understood, however, that any multiple of two or three may be employed as the multiplication factor. As shown therein, an input carier signal having a frequency which varies between 1500 c.p.s. to 3500 c.p.s. is connected to a novel automatic gain control circuit 10. A feedback loop 12 provides the necessary control voltage to control circuit 10 whereby an output 14 thereof will have a constant amplitude wave form. The output of control circuit 10 is multiplied by a frequency tripler 16 to provide an output therefrom whose frequency will be in the range of 4500 to 10,500 c.p.s. The tripling action produces a wave form which is not satisfactory for doubling and mixing. Therefore, the output 18 from tripler 16 is fed to amplifier and limiter circuitry 20 to remove much of the phase and amplitude distortion. It may be considered, at this stage, that the automatic gain control circuit 10 is not necessary if the tripler 16 produces such a phase and amplitude distorted output. However, for a proper tripling operation an input signal thereto is required which will not vary in amplitude with variations in the carrier signal. This requirement will be more fully realized and understood from the discussion of the accompanying views and figures of the drawings. The squared output of amplifier and limiter circuits 20 is multiplied by a factor of two in frequency doubler 22 to produce an output having a frequency of between 9 kc. and 21 kc. This output is again amplified and clipped by amplifier and limiter circuit 24. The resultant signal, having a frequency six times greater than the original carrier, has a phase distorted wave form. To correct the phase distortion, the properties of a high-Q tank circuit are employed. Such a circuit tends to a great extent to produce an output wave form which is a true sinusoid irrespective of the input waveform. There is, however, one restriction; for the best output waveform, the repetition rate at the input should be approximately equal to the resonant frequency of the tank circuit. Since the frequency of the multiplied signal can be expected to vary from 9 kc. to 21 kc., a tracking technique is necessary.

In implementing the necessary frequency tracking, a voltage controlled local oscillator 26 operating at 430 kc., ±6 kc., is used. In conjunction with a balanced mixer 28, it converts the multiplied audio-frequency to a new frequency. This new frequency is, at all times, within 200 c.p.s. of 445 kc. The local oscillator is part of a frequency-locked servo loop which responds to input frequency changes. Since the frequency of the local oscillator is made to vary as the input signal varies, by an amount almost as great as that of the input signal, but in the opposite direction, the converted output, representing the sum of these two, is a nearly constant frequency. This essentially constant output frequency is now well suited for application to high-Q tank circuits which, in turn, will convert the waveform to a good sine wave.

At this point a conventional single stage intermediate frequency amplifier 30 is used. Double tuned transformers are customary at both the input and the output of such amplifier stages. Thus, a total of four tank circuits are provided. The gain of the amplifier is held to a very low value since gain is neither necessary nor desirable. The signal, at the output, is changed to a good sinusoid, suitable for data production. Consequently, it is ready for application to a final data mixer 34. It is also used, as a frequency sample, for a discriminator 32 which provides the direct current error signal for the voltage controlled local oscillator. Collectively, the intermediate frequency amplifier, the discriminator, the voltage controlled local oscillator and the balanced mixer constitute an elementary type of frequency locked tracking filter.

The original signal has now been multiplied by six and restored to a since wave. Because of the intervening processes, the final signal now occurs at 445 kc. Insofar as data are concerned, this frequency conversion introduces an error, in frequency and in phase. To eliminate this error, the same voltage controlled local oscillator 26, used in producing this frequency conversion, is also used to produce an identical frequency in the other channel. More specifically, the frequency from the other tracking filter, which operates in the channel originating with the 324 mc. carrier, closely approximates that of the 54 mc. tracking filter after the latter has been multiplied by six. By converting both of these frequencies through the use of a common local oscillator, the phase and frequency error added to each carrier is identical. These two errors are then cancelled in the final mixer, providing true, accurate data.

Although waveform restoration is not needed in the high frequency channel, it is provided, as a mater of convenience, after frequency conversion. Also the same type of amplifier, in each channel, tends to produce similar phase shifts. With high-Q tank circuits some phase shift, caused by the 400-c.p.s. frequency variation, is inevitable in each amplifier. The 400-c.p.s. variation is that small part of the total Doppler effect which is not removed by the AFC loop. To the extent that these phase shifts can be made equal, they cancel in the output mixer 34.

The final data mixer is a conventional balanced bridge. An inductance-capacitance low-pass filter 36 in the output circuit provides a cut-off frequency of about 200 c.p.s. The filter assists in the reduction of spurious signals in the output data. It also provides a response of uniform amplitude throughout the entire dispersive Doppler frequency range. Such constant amplitude operation is very desirable for data recording and reduction purposes.

Figure 2:
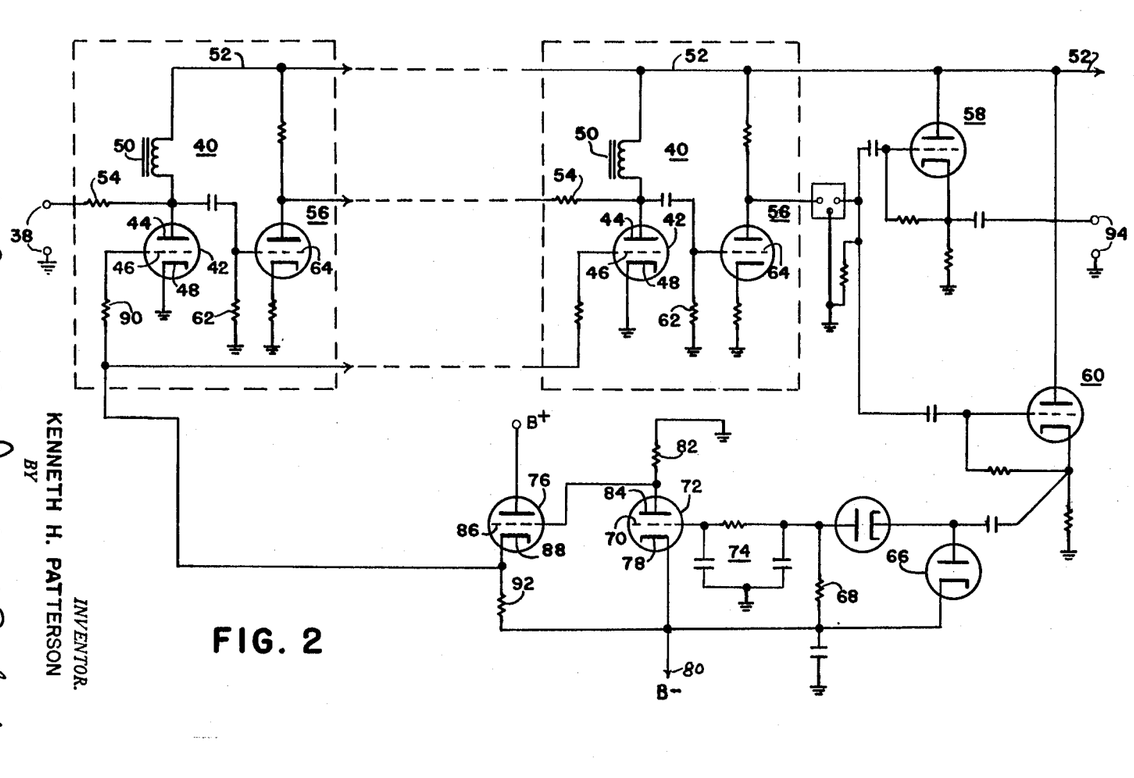
FIG. 2 is a schematic wiring diagram of the automatic gain control circuit.

Referring to FIGURE 2, there is shown therein a schematic wiring diagram of the novel automatic gain control circuit 10 of FIGURE 1. In order to make the frequency tripler practical in operation, the output wave form thereof must be at all times at an optimum condition. As will be realized from the below description of the tripler, the automatic gain control circuit 10 must provide the tripler with an input signal of constant amplitude. A special type of automatic gain control circuit is essential since other types of circuits produce bad effects. For instance, limiters are not suitable because they tend to produce square waves and conventional automatic gain control system, with normal audio circuits, also introduce distortion. In both instances, wave form restoration is not practicable because of the overall requirement that operation shall extend beyond one full octave. The tripler characteristics are such that operation with square waves, and other wave forms with fast rise times, is impractical.

The automatic gain control circuit of this invention accomplishes all of the necessary operations while overcoming the above stated problems. As shown in FIGURE 2, an input constituted of a carrier wave having a frequency which may be expected to vary between 1500 c.p.s. and 3500 c.p.s. is superimposed on input terminals 38. An automatically varied attenuator section 40 provides the necessary control without introducing serious distortion. Attenuator section 40 is constituted of a vacuum tube 42 having a plate 44, grid 46, and cathode 48. Plate 44 is connected through a choke coil 50 to a B+ voltage supply 52. Coil 50 prevents any of the high frequency signal from passing to other stages. In operation, the plate resistance of tube 42 functions as an automatically variable shunt resistance and, in conjunction with a resistance 54, provides a variable degree of attenuation. An audio frequency voltage amplifier 56 is connected to the output of section 40. Section 40 and amplifier 56 comprise a basic unit which may be cascaded in any multiple depending upon the amount of attenuation required. Two such units are shown in FIGURE 2 with dotted lines therebetween to designate that any number may be employed to produce the required characteristics. It is to be understood that one unit of section 40 and amplifier 56 is sufficient for purposes of attenuating an input signal. The output of amplifier 56 is divided among two cathode follower sections 58 and 60. The output of the automatic gain control circuit 10 is provided from cathode follower section 58. The output of cathode follower section 60 drives the automatic gain control (AGC) loop to furnish a control bias to section 40. The function of the AGC loop is to vary the plate resistance of tube 42 so that with an audio frequency signal of large amplitude, the plate resistance will be small; and conversely, with a small amplitude AF input signal the plate resistance will be large. Since coil 50 offers a high impedance to any AF signal, the signal can go to ground through either the principal shunt element, tube 42 or resistance 62. It is then seen that the voltage applied to grid 64 of amplifier 56 is controlled by the AGC loop.

In setting forth the operation of the AGC loop, it will be assumed that a small audio frequency signal is being received. It has been stated that cathode follower section 60 drives the AGC loop on its portion of the output from amplifier 56. A voltage doubler rectifier 66 is connected to the output of section 60. The output of rectifier 66 is a doubled and rectified voltage proportional to the output level of section 60 and appears across a resistance 68. The output of rectifier 66 is applied to a grid 70 of a vacuum tube 72 through a resistance capacitance, low-pass filter 74. Thus the bias for the grid of tube 72 is essentially a small, constant D.C. voltage. This low value of bias or contact potential causes the plate resistance of a vacuum tube 76 to stabilize at a relatively low value. A cathode 78 of tube 72 is connected to a B-negative supply 80 and a resistance 82 is connected between the plate 84 of tube 72 and ground. Most of the voltage drop between supply 80 and ground occurs, therefore, across resistance 82 and is relatively high. It is seen that plate 84 of tube 72, under these conditions, would assume a relatively high negative potential. This potential at plate 84 is applied to grid 86 of tube 76. This highly negative potential on grid 86 causes the plate resistance of tube 72 to be relatively large. The voltage drop between supply 80 and ground, therefore, is primarily then in the plate resistance of tube 72. Cathode 88 of tube 76 assumes a potential only slightly positive to that of grid 86. This highly negative value of potential on cathode 88 is applied through a resistance 90 to grid 46 of tube 42. Grid 46 being highly negative, the plate resistance of tube 42 is relatively large. This causes minimum attenuation of the audio frequency signal input which is the desired result.

If the amplitude of the applied AF input signal is excessive, the operating conditions described above are reversed. Grid 64 receives a larger voltage which causes the output of amplifier 56 to increase. This increased output is applied to cathode follower section 60 which in turn applies an increased output therefrom to the voltage doubler rectifier 66. The voltage drop across resistance 68 is thereby larger which is applied to grid 70 through filter 74 causing the plate resistance of tube 72 to assume a larger value. More of the voltage between supply 80 and ground will occur across the plate resistance of tube 72 and hence the potential on plate 84 will increase this higher value of potential is applied to grid 86 which, in turn, lowers the value of plate resistance of tube 76. Resistance 92 then absorbs a greater voltage drop which causes cathode 88 to assume a higher value of potential. The potential on cathode 88 is transferred through resistance 90 to grid 46. This lowers the plate resistance of tube 42 and increases the attenuation of the automatic gain control circuit.

As previously mentioned, one attenuator section and amplifier proved to have a somewhat limited range of attenuation. The performance of the frequency tripler 16 became erratic when the input level was varied by more than 7 db. To correct this deficiency in actual practice of the invention, two additional attenuator-amplifier stages were cascaded between the stages shown in FIGURE 2 and outlined with dotted lines. This addition permits input amplitude variations of 28 db and tripler operation is then satisfactory throughout the entire range. At all times the output of the AGC circuit at terminals 94 is an accurate replica of the sinusoidal input.

The necessity of the novel and improved automatic gain control circuit will be realized from an understanding of the requirements and operation of frequency tripler 16. In reference to FIGURE 3, there is shown the frequency tripler 16, amplifier, and limiter 20 and a differentiation network necessary for providing a proper input signal to frequency doubler 22. The two problems associated with the frequency tripler are first, the limitations imposed upon the input signal, and second, for data purposes, the distortion in the output wave form thereof must be reduced to a reasonable level. Considering the circuitry shown in FIGURE 3, an amplifier section 96 precedes the frequency tripler circuit. The B+ power supply 52 provides the positive potential for the circuitry. A pair of diodes 98 and 100 are connected in one leg of a bridge circuit having the other legs consisting of resistances 102, 104, and 106. The restriction on the input to the tripler circuit and the most significant feature of the device is that its operation, in principle, depends upon a variability in the forward conducting resistance of diodes 98 and 100. This variability is a function of the instantaneous value of the applied potential. It then follows that the minimum value of this resistance is determined by the peak amplitude of the applied input signal from the automatic gain control circuit. Consequently, for a given magnitude of resistance 102, the input signal level should be held at a precise, corresponding value. Under such circumstances, the tripler parameters can be set initially and then require no further attention except for component failure. These conditions are necessary for field use where variable input signal levels are certain to be encountered.

Figure 3:
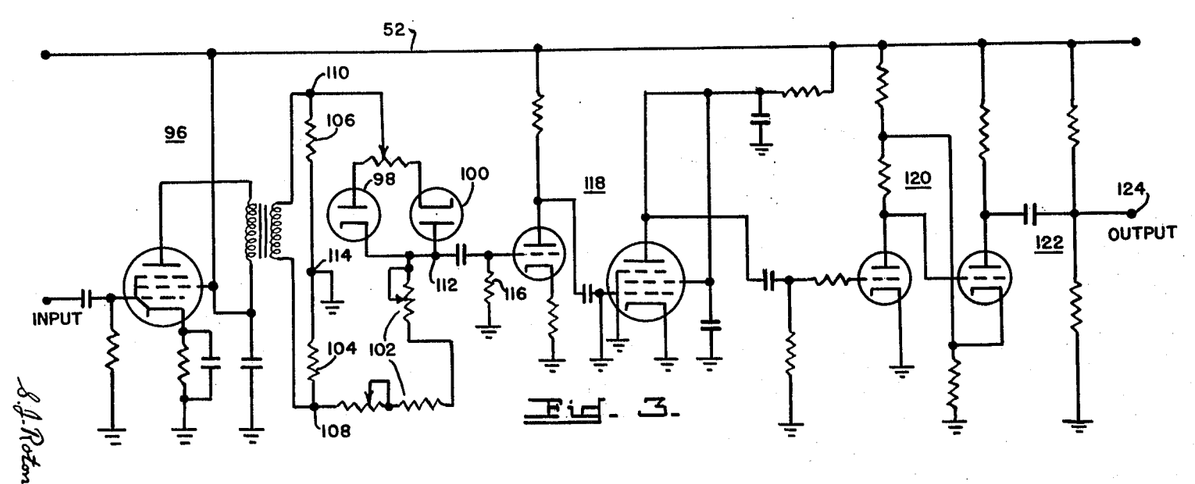
FIG. 3 is a schematic wiring diagram of the broad band frequency tripler, amplifier, and limiter circuits.
Figure 10:
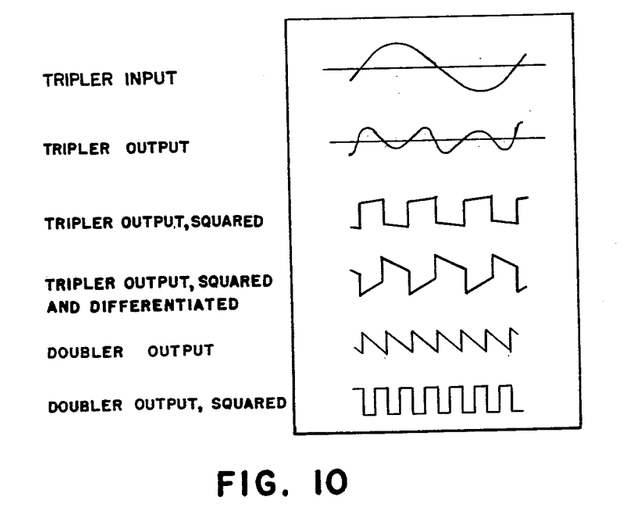
FIG. 10 is a graphical representation of the wave forms at various points throughout the broad band frequency multiplier and mixer circuits.

The tripling action can be realized from the following: The forward conduction resistance of either of diodes 98 or 100 in the non-saturated state varies inversely with the applied voltage. Resistances 104 and 106 are made equal and, therefore, any voltage applied across the bridge is, at all times, divided equally between resistances 104 and 106. Each diode exhibits a forward conducting resistance that varies throughout each input cycle. This variation is from an exceptionally high value, when the plate of the diode is negative with respect to the cathode, to some relatively low value when the polarity condition reverses. In practice, resistance 102 is adjusted so that its value is somewhat greater than the lowest resistance value offered by either of the diodes. A ratio of the voltage drops across the diodes to the voltage drop across resistance 102 will then vary from some value below unity to some value above unity depending upon the applied voltage amplitude at points 108 and 110 of the bridge. Frequency tripling is produced in the following manner: The voltage level of a sinusoidal input is assumed to be momentarily at zero. Reference is made to FIGURE 10 wherein a graphical representation of the tripler voltages is shown. The bridge output at points 112 and 114 is at this time also at a zero level since it is a passive device. As time proceeds from zero the increasing input voltage to the bridge causes one of the diodes to conduct. During the early portion of this voltage rise, the diode resistance, though finite, is still quite high. Consequently, the voltage drop across the diode resistance exceeds that across resistance 102. Since, on the opposite side of the bridge, the voltage across resistance 106 is at all times equal to that across resistance 104, the bridge is unbalanced. Accordingly, a voltage differential is present across the output at points 112 and 114. At a point approximately one-third of the positive half cycle of the input from zero, the forward conducting resistance of the diode is reduced to a value which is equal to that of resistance 102. The bridge is then balanced and the output is zero even though a voltage exists across the input thereof. As time progresses toward the two-thirds point of the positive half cycle of the input, the potential across the diode falls to a value which is less than that which simultaneously appears across resistance 102 because of the higher applied voltage and the lower diode resistance. This condition again produces an unbalance in the bridge. However, the unbalance, and consequently the polarity of the output, are both opposite to those which respectively existed during the initial voltage rise of the input. At the point in time approximately at two-thirds of the positive half-cycle of the input, the bridge is again balanced and the output potential returns to zero. From the two-thirds point to the next point of zero crossing of the input voltage the bridge unbalance is similar to the condition which previously existed during the first one-third of the positive half-cycle of the input. In this manner, during the positive half cycle of the input voltage, the output from the bridge consists of three half-cycles. During the next input half-cycle, the operation duplicates the action which occurred during the first half-cycle of the input voltage with the exception of a polarity reversal. However, the quiescent and conducting diodes interchange functions in accordance with the reversed polarity of the input half-cycle. The final result is that for each complete input cycle the bridge produces an output of six half-cycles, equivalent to three full cycles. The output of the frequency tripler appears as a voltage drop across resistance 116 and is applied to an amplifier stage 118. The amplified signal is then applied to a limiter section 120 and finally to a differentiation network 122. The output of the tripler is thus amplified and clipped to produce cycles of uniform amplitude and to improve the reliability of the frequency tripler operation. This process is shown by the graphical representation of FIGURE 10 designated: "Tripler output, squared." Phase distortion, indicated by a slight differential in each successive zero-axis crossing, is still present. However, in order to produce the desired final data, the tripled frequency is yet to be doubled. Since frequency doubling on a broad band basis also introduces distortion, complete wave form restoration is more conveniently deferred until after the doubling has been accomplished. The doubler, however, does not operate well with a square wave input signal. Consequently, the square waves, previously produced, are partially differentiated by differentiation network 122. The output of network 122 at point 124 is shown in FIGURE 10 by the graphical representation designated: "Tripler output, squared and differentiated."

Figure 4:
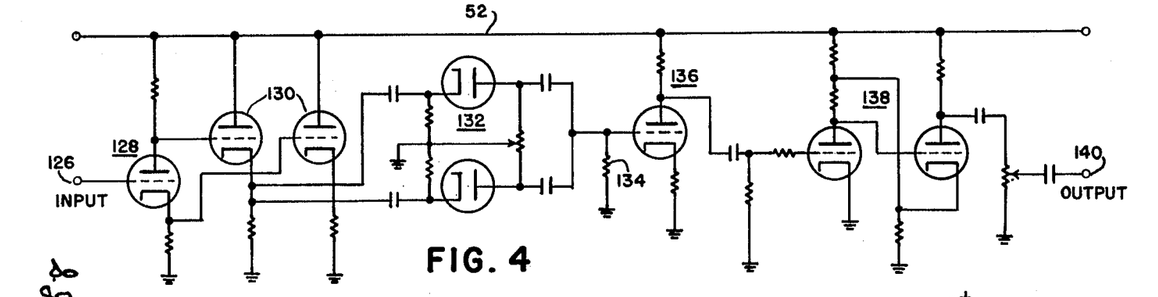
FIG. 4 is a schematic wiring diagram of the broad band frequency doubler, amplifier, and limiter circuits.

Reference is made to FIGURE 4, wherein is shown the doubler and associated circuitry. The voltage supply to the circuitry shown therein is designated by the numeral 52. The output of differentiation network 122 is applied to an input terminal 126 and phase inverter 128. The two signal outputs from the phase inverter, 180° apart, are then used to drive through amplifiers 130, full wave, push-push frequency doubler 132 with resistive loading. The output signal from the doubler resembles a sawtooth due to the previous partial differentiation and is shown in FIGURE 10 by the graphical representation designated: "Doubler output." It is to be understood that the usual harmonic amplifiers are not suitable for purposes of this invention for either the tripling or the doubling operation due to the required bandwidth. The output of the doubler is impressed across resistance 134 and to again assure a uniform amplitude on a cycle by cycle basis the sawtooth signal is amplified and clipped by amplifier 136 and limiter 138 respectively. The output of the limiter at terminal 140 is shown in FIGURE 10 by the graphical representation entitled: "Doubler output, squared." The squaring process eliminates the need for balancing adjustments in the frequency doubler and again produces the desired squared waveform.

To correct the phase distortion of the multiplied signal, the properties of a high-Q tank circuit are employed. Such a circuit tends to produce an output waveform which is a true sinusoid. To a great extent this characteristic is exhibited irrespective of the input waveform. There is, however, one restriction; for the best output waveform, the repetition rate at the input should be approximately equal to the resonant frequency of the tank circuit. Since the frequency of the multiplied signal can be expected to vary from 9 kc. to 21 kc., a tracking technique is necessary.

Figure 5:
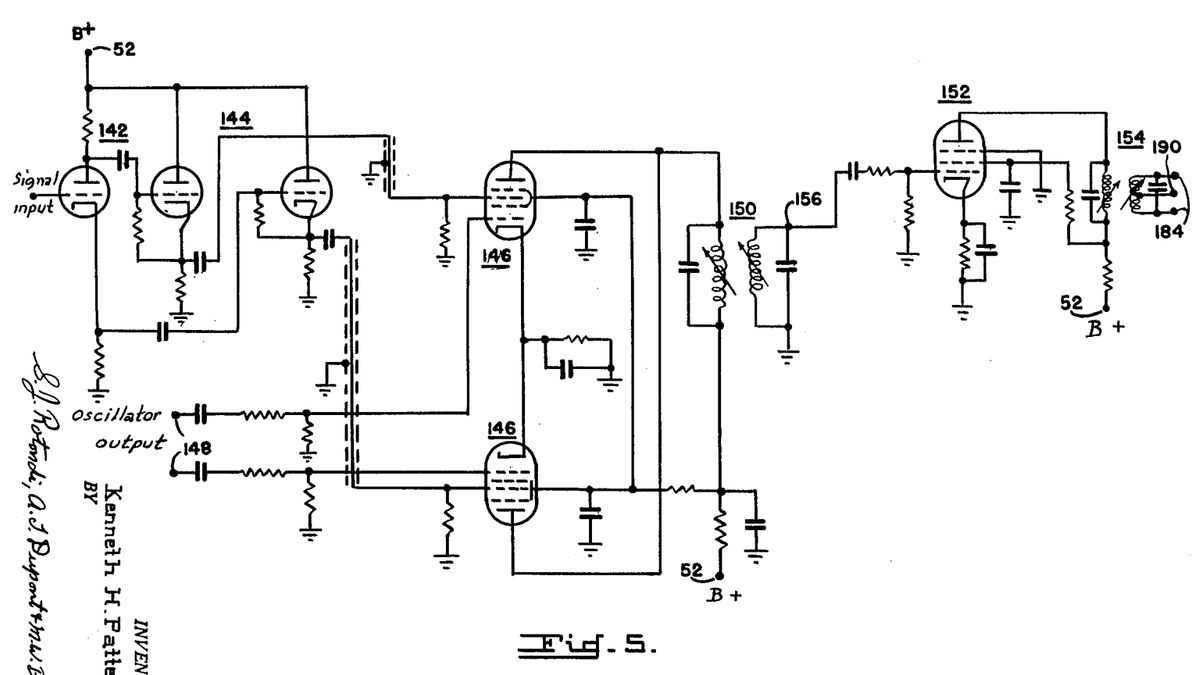
FIG. 5 is a schematic wiring diagram of the balanced mixer and amplifier circuits.

Referring to FIGURE 5, there is shown therein one channel for shaping the waveform of a signal. The instant invention employs two such channels; one for the multiplied signal and the other for the second carrier input. In FIGURE 5, the signal output from limiter 138 is applied to phase inverter 142. The positive potential for the circuit is applied through the B+ terminal designated with the numeral 52. The two signals from the inverter, 180° apart in phase, are applied through cathode follower amplifier sections 144 to a pair of balanced mixers 146. Terminals 148 are disposed for connection with the voltage controlled local oscillator 26 which supplies a signal having a frequency which varies between 424 and 436 kc. approximately. The signals from oscillator 26 and amplifiers 144 are added in mixers 146 to produce a signal which has a frequency compatible with the resonant frequency of the intermediate frequency amplifier 30. A double tuned transformer 150 comprises the input to amplifier section 152, and tuned transformer 154 is connected to the output. From a point 156, an output is taken and directed to the frequency discriminator circuit 32 which will provide the necessary control for oscillator 26.

Figure 7:
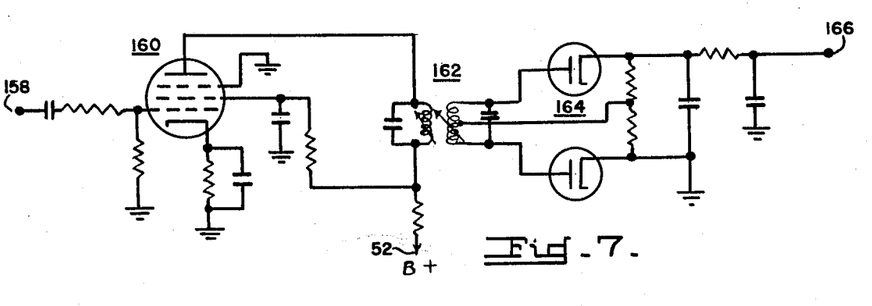
FIG. 7 is a schematic wiring diagram of the frequency discriminator and associated tank circuit.

Referring to FIGURE 7, there is shown therein the frequency discriminator employed in the instant invention. As shown therein, a terminal 158 is disposed for connection with point 156 of one of the two channels of which one is shown in FIGURE 5. The B+ voltage supply is connected at 52 and the signal is supplied to an amplifier 160 and double tuned transformer 162. The resultant signal is connected to a discriminator section 164 which supplies a direct current error signal for oscillator 26 at terminal 166.

Figure 6:
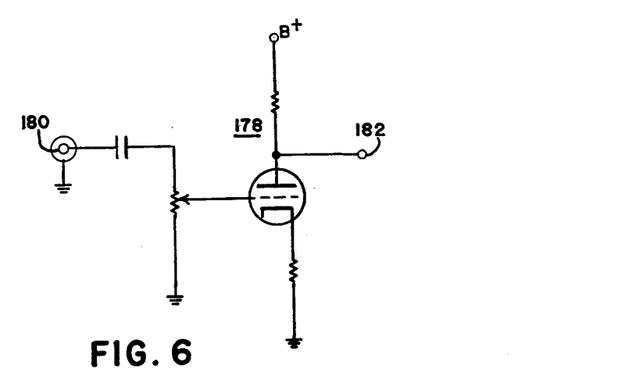
FIG. 6 is a schematic wiring diagram of the input amplifier for the 9 kc. to 21 kc. signal.
Figure 8:
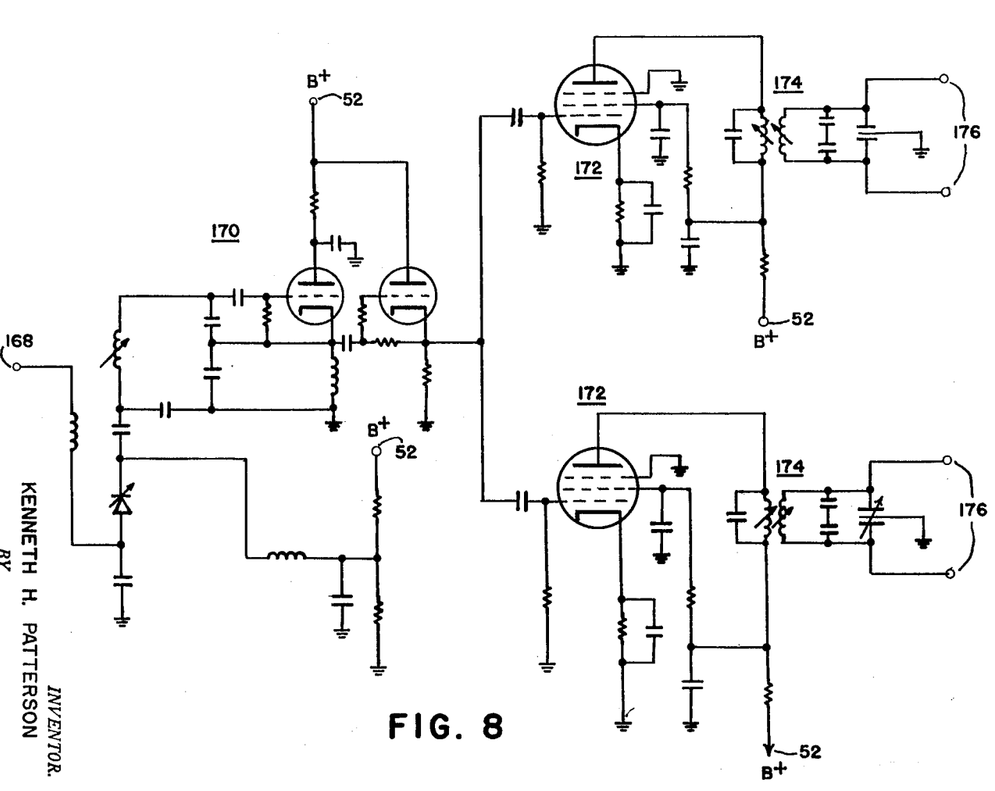
FIG. 8 is a schematic wiring diagram of the voltage controlled local oscillator having two channels or outputs.
Figure 9:
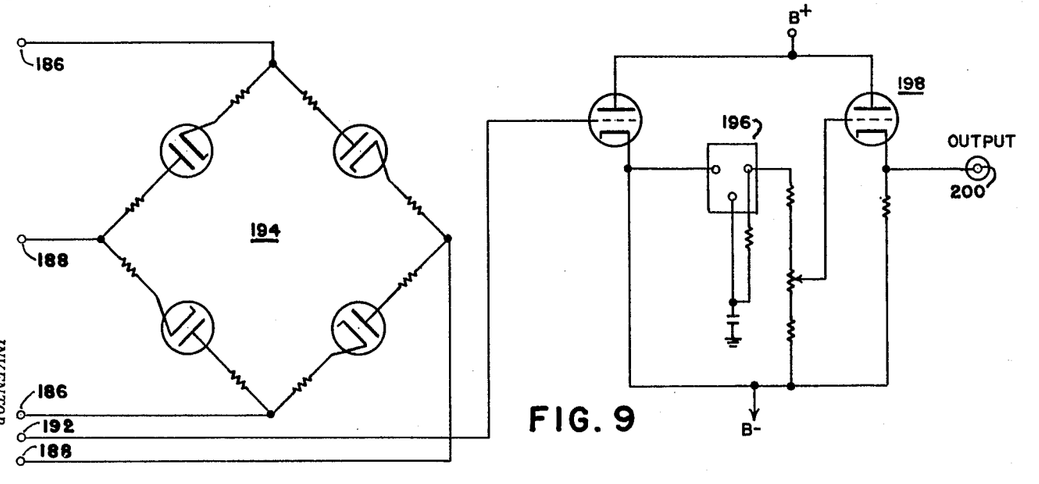
FIG. 9 is a schematic wiring diagram of the dispersive Doppler mixer and final filter circuits.

In reference to FIGURE 8, there is shown therein the voltage controlled local oscillator of the present invention. As illustrated therein, an input terminal 168 is disposed for connection with the discriminator output and the voltage source is connected at points 52. Oscillator section 170 is connected through a pair of amplifier sections 172 to double tuned transformers 174. The outputs of each transformer at terminals 176 are disposed for connection with the two channels of which one is shown in FIGURE 5. FIGURE 6 shows the amplifier section 178 which is disposed for connection at terminal 180 with the 9 kc. to 21 kc. carrier input. The output of the amplifier section at terminal 182 is disposed for connection with the input of the second channel of which the one is illustrated in FIGURE 5. The output at points 184 of one of the two channels of which one is shown in FIGURE 5 is disposed for connection with terminals 186 and the output of the other channel is disposed for connection with terminals 188 of FIGURE 9. Terminal 190 of the one channel is disposed for connection with ground and of the other channel is disposed for connection with terminal 192 of FIGURE 9. As shown in FIGURE 9, the outputs of the IF amplifiers of each channel are mixed in mixer bridge 194. The output of the mixer is reflected to transformers 154 and an output is provided therefrom at terminals 190. Final filter section 196 provides a cut-off frequency of about 200 c.p.s. and direct coupled cathode follower 198 completes the circuitry. An output is provided at terminal 200 which is the difference of the amounts of dispersive Doppler introduced into each of the input carriers.

It is to be understood that the particular exemplification shown and described in the drawings and detailed description may be practiced otherwise than as exemplified and that variations and modifications can be made within the scope of the appended claims without departing from the spirit of the invention.

What is claimed is:

1. A frequency measuring circuit comprising a pair of input signals, a gain control circuit having an input connected to one of said input signals, a frequency multiplier connected to an output of said control circuit, a tracking filter connected to an output of said multiplier and to the other of said input signals, a pair of tank circuits connected to outputs of said tracking filter, and a final mixer connected to an output of each of said tank circuits to provide an output signal having a frequency which is the difference of the frequencies of the multiplier output and said other input signal.

2. The circuit of claim 1 wherein said tracking filter includes a pair of balanced mixers, an oscillator connected to an input of each of said balanced mixers, and a frequency discriminator connected to an output of one of said tank circuits, one of said balanced mixers being responsive to the oscillator output and the multiplier output, the other of said balanced mixers being responsive to the oscillator output and said other input signals, said final mixer being responsive to the outputs of said tank circuits.

3. A frequency measuring circuit comprising a gain control circuit responsive to a first input signal, a first balanced mixer, a frequency multiplier connected between said control circuit and said first balanced mixer, a second balanced mixer responsive to a second input signal, a pair of tank circuits each connected to an output of a respective balanced mixer, a frequency discriminator connected to an output of one of said tank circuits, a controllable oscillator disposed for supplying a selectable frequency signal to said balanced mixers responsive to the output of said discriminator, and a final mixer disposed for providing an output signal responsive to the outputs of said tank circuits, the output signal having a frequency which is the difference of the frequencies of the second input signal and a factor of the frequency of the first input signal.

4. A frequency measuring circuit comprising an automatic gain control circuit responsive to a first input signal; a frequency tripler connected to said control circuit; a frequency doubler; first wave shaping means connected between said tripler and doubler for conditioning the tripler output to a predetermined wave shape constituting the doubler input; second wave shaping means connected to said doubler for conditioning the doubler output; a frequency controllable oscillator; a pair of balanced mixers each having an input connected to said oscillator, one of said balanced mixers responsive to a second input signal, the other of said balanced mixers connected to the output of said second wave shaping means; a pair of amplifier circuits each connected to an output of a respective one of said balanced mixers and including an input tuned circuit, an amplifier, and an output tuned circuit serially connected output to input respectively; a frequency discriminator for supplying a voltage to said oscillator proportional in magnitude to the frequency of an output of the input tuned circuit of one of said amplifier circuits; and a final mixer connected to outputs of said amplifier circuits.

5. The circuit of claim 4 wherein said discriminator includes in serial connection an amplifier and a tuned circuit respectively, the amplifier of said discriminator being connected to an output of the input tuned circuit of one of said amplifier circuits.

6. A frequency measuring circuit comprising a pair of input signals, attenuation means connected to one of said input signals for controlling the amplitude thereof, an audio amplifier coupled to the output of said attenuation means, a pair of cathode-follower amplifiers coupled to the output of said audio amplifier, a control loop disposed for supplying a bias voltage to said attenuation means proportional to the voltage magnitude of the output of one of said cathode-follower amplifiers and responsive thereto, a frequency multiplier responsive to the other of said cathode-follower amplifiers, a tracking filter responsive to said frequency multiplier and the other of said input signals, a pair of intermediate frequency amplifiers connected to outputs of said tracking filter, and a final mixer connected to an output of each of said intermediate frequency amplifiers.

7. A frequency measuring circuit comprising a pair of input signals; attenuation means connected to one of said input signals for controlling the amplitude thereof and having an output positive with respect to a point of zero potential; rectifying means responsive to the output of said attenuation means for supplying a constant voltage at an output thereof which is proportional in magnitude to the amplitude of the attenuated output; a pair of vacuum tubes each having an anode, a cathode, and a grid; a source of potential negative with respect to the point of zero potential connected to the cathode of one of said tubes, the grid of said one tube coupled to the output of said rectifying means; a plate impedance connected between the anode of said one tube and the point of zero potential; a source of potential positive with respect to the point of zero potential connected to the anode of the other of said tubes, the grid of said other tube connected to the anode of said one tube; a cathode impedance connected between the cathode of said other tube and the source of negative potential, said attenuation means connected to the output of said attenuation means; a tracking filter responsive to said frequency multiplier and the other of said input signals; a pair of amplifier circuits connected to outputs of said tracking filter; and a final mixer connected to outputs of said amplifier circuits.

8. A frequency measuring circuit comprising a pair of input signals; attenuation means connected to one of said input signals for controlling the amplitude thereof and having an output positive with respect to a point of zero potential; a first rectifier having an anode and a cathode, said anode of said first rectifier connected to the output of said attenuation means; a second rectifier having a cathode and an anode, said cathode of said second rectifier connected to the output of said attenuation means; the cathode of asid first rectifier connected to a source of potential negative with respect to the point of zero potential; a shunt impedance connected between the cathode of said first rectifier and the anode of said second rectifier; a first vacuum tube having a cathode an anode, and a grid, said cathode of said first tube connected to the source of negative potential; a smoothing filter connected between the anode of said second rectifier and the grid of said first tube; a plate impedance connected between the anode of said first tube and the point of zero potential; a second vacuum tube having an anode, a cathode, and a grid, said anode of said second tube, connected to a source of potential positive with respect to the point of zero potential and said grid of said second tube connected to the anode of said first tube; a cathode impedance connected between the cathode of said second tube and the source of negative potential, said attenuation means connected to the cathode of said second tube; a frequency multiplier connected to the output of said attenuation means; a tracking filter connected to and being responsive to said frequency multiplier and the other of said input signals; a pair of intermediate frequency amplifier circuits each connected to outputs of said tracking filter and a final mixer responsive to outputs of said amplifier circuits for producing an output having a frequency which is the difference of the frequency of said other input signal and a multiple of the frequency of said one input signal.

9. A circuit as in claim 8 wherein said attenuation means includes a plurality of stages serially connected in successive order, a first of said stages being connected to said one input signal, the others of said stages being connected to the output of a succeeding one of said stages, each of said stages including a voltage divider circuit variable in response to the output at the cathode of said second tube; and amplifying means responsive to the output of a last of said stages, said multiplier connected to the amplifying means output.

10. The circuit of claim 9 wherein each of said voltage divider circuits includes an input impedance and an input vacuum tube having an anode, a cathode, and a grid, said input impedance connected between the input of each of said stages and the anode of said input tube, each of said stages including an inductive impedance and an audio amplifier, said inductive impedance connected between the source of positive potential and the anode of said input tube, said audio amplifier responsive to an output at the anode of said input tube, the grid of said input tube connected to the cathode of said second tube, the cathode of said input tube connected to the point of zero potential.

11. A frequency measuring circuit comprising a pair of input signals; an automatic gain control circuit responsive to one of said input signals; a frequency multiplier connected to said control circuit and responsive to an output thereof and having an inherent phase and amplitude distorted output; means for shaping the distorted output including in serial connection a first amplifier having a gain substantially greater than unity connected to said frequency tripler and responsive to an output thereof, a first limiter for limiting the amplitude of the first amplifier output to a predetermined value, a differentiation network, a first phase inverter having a pair of outputs 180° out of phase with one another; a frequency doubler connected to the first phase inverter outputs; a second amplifier connected to the output of said doubler; second and third phase inverters each having a pair of outputs 180° out of phase with one another; a second limiter connected between said second amplifiers and said second inverter, said third inverter being responsive to the other of said input signals; a pair of balanced mixers; a voltage controlled local oscillator having a pair of outputs each connected to an input of a respective balanced mixer; a pair of intermediate frequency amplifiying circuits each connected to an output of a respective one of said balanced mixers, one of said amplifying circuits including in serial connection an input tuned transformer, an amplifier, and an output tuned transformer, the other of said amplifying circuits including an input tuned transformer, a pair of amplifiers connected to an output of the input transformer of said other amplifying circuit, and a pair of output tuned transformers each connected to an output of a respective amplifier of said other amplifying circuit; an output of each of said second and third inverters being connected to a respective balanced mixer, the input transformer of said amplifying circuits connected to an output of a respective balanced mixer; a frequency discriminator connected from one of the output transformers of said other amplifying circuit to an input of said oscillator; a final mixer connected to the output transformer of said one amplifying circuit and to the other output transformer of said other amplifying circuit; and a final filter circuit connected to an output of said final mixer.

12. An automatic gain control circuit comprising attenuation means responsive to an input signal for controlling the amplitude thereof and having an output positive with respect to a point of zero potential; rectifying means responsive to the output of said attenuation means for supplying a constant voltage at an output thereof which is proportional in magnitude to the amplitude of the attenuated output; a pair of vacuum tubes each having an anode, a cathode, and a grid; a source of potential negative with respect to the point of zero potential connected to the cathode of one of said tubes, the grid of said one tube coupled to the output of said rectifying means; a plate impedance connected between the anode of said one tube and the point of zero potential; a source of potential positive with respect to the point of zero potential connected to the anode of the other of said tubes, the grid of said other tube connected to the anode of said one tube; and a cathode impedance connected between the cathode of said other tube and the source of negative potential, said attenuation means connected to the cathode of said other tube.

13. An automatic gain control circuit comprising attenuation means responsive to an input signal for controlling the amplitude thereof and having an output positive with respect to a point of zero potential; a first rectifier having an anode and a cathode, said anode of said first rectifier connected to the output of said attenuation means; a second rectifier having an anode and a cathode, said cathode of said second rectifier connected to the attenuated output, the cathode of said first rectifier connected to a source of potential negative with respect to the point of zero potential; a shunt impedance connected between the cathode of said first rectifier and the anode of said second rectifier; a first vacuum tube having an anode, a cathode, and a grid, the cathode of said first tube connected to the source of negative potential; a smoothing filter connected between the anode of said second rectifier and the grid of said first tube; a plate impedance connected between the anode of said first tube and the point of zero potential; a second vacuum tube having an anode, a cathode, and a grid, the anode of said second tube connected to a source of potential positive with respect to the point of zero potential and the grid thereof connected to the anode of said first tube; and a cathode impedance connected between the cathode of said second tube and the source of negative potential, said attenuation means connected to the cathode of said second tube.

14. The circuit of claim 11 wherein said attenuation means include a voltage divider circuit variable in response to the output at the cathode of said second tube and amplifying means responsive to the output of said divider circuit.

15. The circuit of claim 11 wherein said attenuation means include a plurality of stages serially connected in successive order, a first of said stages being responsive to the input signal, the others of said stages being connected to the output of a succeeding one of said stages, each of said stages including a voltage divider circuit variable in response to the output at the cathode of said second tube; and amplifying means responsive to the output of a last of said stages.

16. The circuit of claim 13 wherein each of said voltage divider circuits includes an input vacuum tube having an anode, a cathode, and a grid; an input impedance connected between the input of each of said stages and the anode of said input tube, each of said stages including an inductive impedance connected between the source of positive potential and the anode of said input tube and an audio amplifier responsive to an output at the anode of said input tube, the grid of said input tube coupled to the cathode of said second tube, the cathode of said input tubes connected to the point of zero potential.

17. An automatic gain control circuit comprising an input vacuum tube having an anode, a cathode, and a grid; an input resistance connected from the anode of said input tube to an input signal source; an inductive impedance connected between the anode of said input tube and a source of anode potential, the cathode of said input tube connected to ground; means connected to the anode of said input tube for amplifying the output thereof; means for rectifying and filtering the output of said amplifying means; first and second vacuum tubes each having an anode, a cathode, and a grid, the grid of said first tube connected to the output of said rectifying means and the cathode thereof connected to a source of negative potential; a plate resistance connected between the anode of said first tube and ground, the anode of said second tube connected to the source of positive potential; a cathode resistance connected between the cathode of said second tube and the source of negative potential; and a coupling resistance connected between the cathode of said second tube and the grid of said input tube.

18. A tracking filter as in claim 17 wherein said amplifier circuit includes an input tuned circuit, an amplifier, and an output tuned circuit serially connected output to input respectively.

19. A frequency measuring circuit comprising a pair of input signals, a gain control circuit responsive to one of said input signals consisting of attenuation means connected to said one input signal for controlling the amplitude thereof, amplifying means connected to said attenuation means, and a control loop connected to an output of said amplifying means for supplying a control voltage to said attenuation means, frequency multiplying means connected to the output of said amplifier and responsive thereto, and means for mixing the output of said frequency multiplier and the other of said input signals to provide an output signal which is the difference of the frequencies of said frequency multiplier and said other input signal.

20. A tracking filter comprising a balanced mixer disposed for connection to an input signal source, a voltage controlled local oscillator having an output connected to an input of said balanced mixer, an intermediate frequency amplifier, said intermediate frequency amplifier including a serial connection, an input tuned transformer, an amplifier tube, and an output tuned transformer, said input transformer being connected to an output of said balanced mixer, and a frequency discriminator, said frequency discriminator connected between said output transformer and an input of said voltage controlled local oscillator.

References Cited in the file of this patent

UNITED STATES PATENTS

| | | |
|---|---|---|
| 2,433,350 | Earp | Dec. 30, 1947 |
| 2,955,199 | Mindes | Oct. 4, 1960 |
| 2,956,239 | Hugenholtz | Oct. 11, 1960 |